(12) United States Patent
Miyashita et al.

(10) Patent No.: US 9,682,530 B2
(45) Date of Patent: Jun. 20, 2017

(54) STACKED COMPOSITE COMPONENT

(71) Applicants: Osamu Miyashita, Toyota (JP); Hideaki Sakai, Toyota (JP)

(72) Inventors: Osamu Miyashita, Toyota (JP); Hideaki Sakai, Toyota (JP)

(73) Assignee: Toyota Iron Works Co., Ltd., Toyota-shi, Aichi (JP)

( * ) Notice: Subject to any disclaimer, the term of this patent is extended or adjusted under 35 U.S.C. 154(b) by 48 days.

(21) Appl. No.: 14/647,225

(22) PCT Filed: Mar. 5, 2013

(86) PCT No.: PCT/JP2013/056034
§ 371 (c)(1),
(2) Date: May 26, 2015

(87) PCT Pub. No.: WO2014/083862
PCT Pub. Date: Jun. 5, 2014

(65) Prior Publication Data
US 2015/0290904 A1   Oct. 15, 2015

(30) Foreign Application Priority Data

Nov. 27, 2012  (JP) .................. 2012-259112

(51) Int. Cl.
| | | |
|---|---|---|
| *B32B 3/06* | (2006.01) | |
| *B32B 3/30* | (2006.01) | |
| *B32B 1/00* | (2006.01) | |
| *B32B 3/26* | (2006.01) | |
| *B60N 2/46* | (2006.01) | |

(Continued)

(52) U.S. Cl.
CPC ................. *B32B 3/30* (2013.01); *B32B 1/00* (2013.01); *B32B 3/06* (2013.01); *B32B 3/266* (2013.01); *B32B 3/28* (2013.01); *B32B 27/08* (2013.01); *B60N 2/466* (2013.01); *B60N 2/682* (2013.01); *B32B 15/08* (2013.01); *B32B 2307/56* (2013.01);
(Continued)

(58) Field of Classification Search
CPC ... Y10T 428/24182; B32B 3/06; B32B 3/266; B32B 2605/003; B29L 2031/3026
USPC ........................................... 428/120
See application file for complete search history.

(56) References Cited

FOREIGN PATENT DOCUMENTS

| | | |
|---|---|---|
| JP | 2003-103676 | 4/2003 |
| JP | 2004-314826 | 11/2004 |

OTHER PUBLICATIONS

Search Report issued in EPO Application No. 13858845.2 on Jun. 22, 2016.

*Primary Examiner* — Alexander Thomas
(74) *Attorney, Agent, or Firm* — Finnegan, Henderson, Farabow, Garrett & Dunner, LLP

(57) ABSTRACT

A laminated composite part includes a first member and a second member. The first member has a predetermined mating surface. The second member has a plate-like portion substantially parallel to the mating surface and having a multiplicity of protrusions formed, and is set on the first member such that the protrusions contact the mating surface. The laminated composite part further includes a curved portion curved so as to provide a recessed design surface, in which an engagement protrusion protruding more than the protrusions is formed integrally with the curved portion of one of the first and second members, located on the design surface side, an insertion hole in which the engagement protrusion is relatively inserted is formed in the other member of the first and second members, and the engagement protrusion is inserted in the insertion hole and is retained so as not to come off from the insertion hole.

7 Claims, 12 Drawing Sheets

(51) Int. Cl.
  *B60N 2/68* (2006.01)
  *B32B 27/08* (2006.01)
  *B32B 3/28* (2006.01)
  B32B 15/08 (2006.01)
  F16F 7/12 (2006.01)
(52) U.S. Cl.
  CPC ..... *B32B 2605/003* (2013.01); *B32B 2605/08* (2013.01); *F16F 7/12* (2013.01)

STACKED COMPOSITE COMPONENT

CROSS-REFERENCE TO RELATED APPLICATIONS

This application is a national phase application of International Application No. PCT/JP2013/056034, filed Mar. 5, 2013, and claims the priority of Japanese Application No. 2012-259112, filed Nov. 27, 2012, the content of both of which is incorporated herein by reference.

TECHNICAL FIELD

The present invention relates to laminated composite parts, and more particularly to an improvement in a laminated composite part that has cushioning properties due to elastic deformation of a multiplicity of protrusions.

BACKGROUND ART

Laminated composite parts are known which have (a) a first member having a predetermined mating surface, and (b) a second member that is made of an elastically deformable resin material, that has a plate-like portion substantially parallel to the mating surface and having a multiplicity of protrusions formed integrally therewith so as to protrude toward the mating surface so that space is created between the plate-like portion and the mating surface, and that is set on the first member such that the protrusions contact the mating surface, and (c) which have cushioning properties as tip ends of the protrusions are pressed by the mating surface and elastically deformed. A part described in Patent Document 1 is an example of such a laminated composite part, and relates to an interior part (armrest etc.) of a vehicle. Patent Document 1 describes a technique of providing a multiplicity of pin-shaped or rib-shaped protrusions on the back surface of a surface material as the second member to improve a feel (soft feel) of the surface material by elastic deformation of the protrusions.

RELATED ART DOCUMENTS

Patent Documents

Patent Document 1: Japanese Patent Application Publication No. 2003-103676

SUMMARY OF THE INVENTION

Problems to be Solved by the Invention

However, in such conventional laminated composite parts, a gap may appear between the mating surface of the first member and the multiplicity of protrusions of the second member in a portion curved two-dimensionally or three-dimensionally so as to provide a recessed design surface. The design surface may therefore undesirably get loose or wrinkled or be lifted, and abnormal noise may be generated due to a position shift associated with such a loose or lifted design surface, which may adversely affect product quality.

The present invention was developed in view of the above circumstances, and it is an object of the present invention to suppress occurrence of a loose or lifted state etc. of the design surface regardless of the shape of a curve in a laminated composite part that has cushioning properties due to elastic deformation of a multiplicity of protrusions, and thus to improve product quality of the laminated composite part.

Means for Solving the Problem

To achieve the object, the first aspect of the invention provides (a) a laminated composite part, which includes a first member having a predetermined mating surface, and (b) a second member that is made of an elastically deformable resin material, that has a plate-like portion substantially parallel to the mating surface and having a multiplicity of protrusions formed integrally with the plate-like portion so as to protrude toward the mating surface so that space is created between the plate-like portion and the mating surface, and that is set on the first member such that the protrusions contact the mating surface, (c) the laminated composite part having cushioning properties as tip ends of the protrusions are pressed by the mating surface and elastically deformed, the laminated composite part characterized in that (d) the laminated composite part comprises a curved portion curved two-dimensionally or three-dimensionally so as to provide a recessed design surface, (e) an engagement protrusion protruding more than the protrusions is formed integrally with the curved portion of one of the first and second members, which is located on the design surface side, (f) an insertion hole in which the engagement protrusion is relatively inserted is formed in the other member of the first and second members, and (g) the engagement protrusion is inserted in the insertion hole and is retained so as not to come off from the insertion hole.

The second aspect of the invention provides the laminated composite part recited in the first aspect of the invention, wherein the engagement protrusion and the insertion hole have different sectional shapes taken along a direction perpendicular to an insertion direction, and at least one of the engagement protrusion and the insertion hole is elastically deformed when the engagement protrusion is inserted into the insertion hole, so that the engagement protrusion and the insertion hole are retained by each other based on the elastic deformation.

The third aspect of the invention provides the laminated composite part recited in the first aspect of the invention, wherein a retaining hole having a different sectional shape from that of the engagement protrusion is formed so as to be continuous with the insertion hole, and the engagement protrusion is moved into the retaining hole after being inserted through the insertion hole, so that at least one of the engagement protrusion and the retaining hole is elastically deformed, and the engagement protrusion and the retaining hole are retained by each other.

The fourth aspect of the invention provides the laminated composite part recited in the first aspect of the invention, wherein (a) a retaining portion is provided near the insertion hole on a back surface of the other member, the back surface is located on an opposite side from the one member, and (b) after the engagement protrusion is inserted through the insertion hole, a tip end of the engagement protrusion which protrudes from the insertion hole is bent and deformed, so that the engagement protrusion is retained by the retaining portion.

The fifth aspect of the invention provides the laminated composite part recited in the first aspect of the invention, wherein (a) a head portion having a non-circular shape as viewed in an insertion direction is provided at a tip end of the engagement protrusion, (b) the insertion hole has a non-circular shape configured to receive the head portion therein, and a retaining protrusion is provided near the insertion hole on a back surface of the other member, the back surface is located on an opposite side from the one member, (c) with the head portion of the engagement protrusion being inserted through the insertion hole so as to protrude toward the opposite side, the engagement protrusion is twisted and deformed so that the head portion crosses over the retaining protrusion, so that the head portion is retained by the retaining protrusion.

The sixth aspect of the invention provides the laminated composite part recited in the first aspect of the invention, wherein (a) the engagement protrusion includes a base portion larger than the insertion hole, and a protruding tip end formed integrally with the base portion and protruding in an axial direction from the base portion, and (b) with the protruding tip end being inserted through the insertion hole and the base portion being in contact with the other member, a retaining member is integrally formed on the other member including an exposed portion of the protruding tip end by insert molding, so that the protruding tip end is fixedly attached to the other member via the retaining member.

The seventh aspect of the invention provides the laminated composite part recited in any one of the first to sixth aspects of the invention, wherein (a) the second member is a plate-like surface material located on the design surface side, and the surface material has the engagement protrusion formed integrally with the surface material, and (b) the first member is a plate-like base material made of a harder resin material than the surface material, and the base material has the insertion hole.

Effects of the Invention

In the laminated composite part as described above, the engagement protrusion is provided on one member located on the design surface side of the curved portion curved so as to provide a recessed design surface, and the engagement protrusion is inserted into the insertion hole in the other member, and is retained so as not to come off from the insertion hole. This prevents the design surface from getting loose or wrinkled, being lifted, etc. regardless of the shape of the curve, which improves product quality.

The second aspect of the invention is the case that the engagement protrusion and the insertion hole have different sectional shapes, and at least one of the engagement protrusion and the insertion hole is elastically deformed when the engagement protrusion is inserted into the insertion hole, so that the engagement protrusion and the insertion hole are retained by each other based on the elastic deformation and since the engagement protrusion can be retained in the insertion hole by merely pressing the engagement protrusion into the insertion hole, an operation of combining the first member and the second member can be easily and quickly performed. Also, a deformation load, namely the retaining strength, of the engagement protrusion and the insertion hole can be appropriately adjusted (tuned) by changing the sectional shapes of the engagement protrusion and the insertion hole. An appropriate engagement state can therefore be easily obtained.

The third aspect of the invention is the case that a retaining hole is formed so as to be continuous with the insertion hole, and the engagement protrusion is moved into the retaining hole after being inserted through the insertion hole, so that at least one of the engagement protrusion and the retaining hole is elastically deformed, and the engagement protrusion and the retaining hole are retained by each other, and since the engagement protrusion can be retained by merely moving the engagement protrusion inserted through the insertion hole into the retaining hole, the operation of combining the first member and the second member can therefore be easily and quickly performed. Also, the retaining strength through the retaining of the engagement protrusion and the retaining hole can be appropriately adjusted (tuned) by changing the sectional shapes of the engagement protrusion and the retaining hole. An appropriate engagement state can therefore be easily obtained.

The fourth aspect of the invention is the case that a retaining portion is provided near the insertion hole and after the engagement protrusion is inserted through the insertion hole. A tip end of the engagement protrusion is bent and deformed, so that the engagement protrusion is retained by the retaining portion, and since the engagement protrusion can be retained by the retaining portion by merely bending and deforming the tip end of the engagement protrusion inserted through the insertion hole, the operation of combining the first member with the second member can be easily and quickly performed.

The fifth aspect of the invention is the case that a head portion having a non-circular shape is provided at a tip end of the engagement protrusion, after the head portion is inserted through the insertion hole, the engagement protrusion is twisted and deformed so that the head portion is retained by the retaining protrusion provided near the insertion hole. Since the head portion can be retained by the retaining protrusion by merely twisting and deforming the engagement protrusion with the head portion inserted into the insertion hole, the operation of combining the first member with the second member can be easily and quickly performed.

The sixth aspect of the invention is the case that the engagement protrusion includes a base portion and a protruding tip, and with the protruding tip end being inserted through the insertion hole and the base portion being in contact with the other member, a retaining member is integrally formed on the other member by insert molding, so that the protruding tip end is fixedly attached to the other member via the retaining member. Accordingly, the operation of combining the first member with the second member can be easily automated, and production efficiency can be improved.

The seventh aspect of the invention is the case that the second member provided with a multiplicity of protrusions is a surface material located on the design surface side, and the surface material has the engagement protrusion, and the hard base material has the insertion hole. The engagement protrusion provided on the elastically deformable surface material can be appropriately retained in the base material. Moreover, predetermined rigidity is ensured by the hard base material, and the surface material has an excellent feel when pressed by a finger or hand due to elastic deformation of the protrusions provided on the surface material.

MODES FOR CARRYING OUT THE INVENTION

Figure 1:
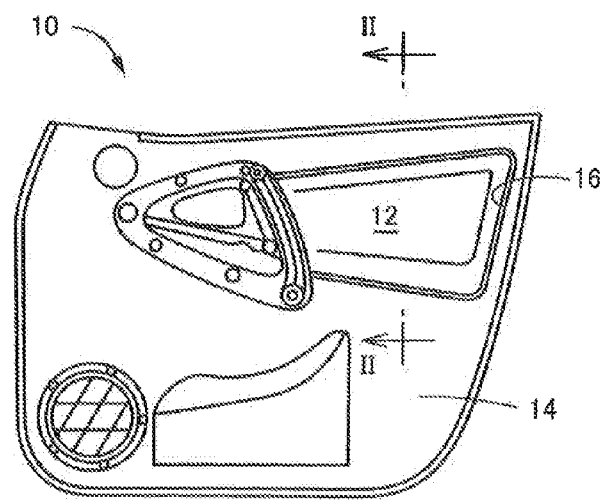
FIG. 1 is a schematic front view of an example of a vehicle door trim to which the present invention is applied as viewed from a design surface side.

The present invention is applied to vehicle interior parts such as a door trim, a luggage side trim, and an instrument panel, and ornaments etc. that are attached to the interior parts, but is also applicable to panel parts for applications other than vehicle applications. The present invention is applicable not only to plate-like panel parts but also three-dimensional parts in which the second member is set on the surface of the first member curved three-dimensionally and having a three-dimensional shape. In the case of using the first member as the base material, relatively hard synthetic resin materials are preferably used such as rigid polyvinyl chloride, polypropylene, polyethylene, and ABS. However, other materials such as a metal may be used. In the case of using the first member as the surface material, or for the resin material of the second member, various thermoplastic resins are preferably used such as soft polyvinyl chloride, styrene resin, olefin resin, and polyester resin. Not only various resin materials, but also a laminated material formed by bonding woven fabric, nonwoven fabric, knitted fabric, etc. to a resin sheet may be used as the surface material. In the case of using the first member as the surface material, a relatively hard base material may be provided on the back surface (on the opposite side from the protrusions) of the second member as necessary.

The multiplicity of protrusions that provide the cushioning properties have, e.g., a rectangular shape as viewed in plan, but may have various shapes such as a square shape, a circular shape, an elliptical shape, or an arc-curved shape. Each protrusion may have a continuously changed sectional shape along its protruding direction, such as a tapered shape in which its sectional area decreases as it gets closer to its tip end, or may have an asymmetrical shape with respect to a centerline in order to facilitate bending in one direction. The multiplicity of protrusions may have the same shape, but may be a mixture of a plurality of kinds of protrusions having different shapes. The protrusions are not limited to dot-shaped protrusions. For example, a multiplicity of parallel elongated rib-shaped protrusions may be provided.

For example, the dot-shaped protrusions are positioned so as to form each side of a multiplicity of polygons so that the protrusions form a grid pattern in which adjoining ones of the polygons have a common side. For example, the grid pattern is continuous repetition of equilateral triangles, squares, or regular hexagons having the same shape as the polygons. However, the grid pattern may be continuous repetition of rectangles, rhombuses, parallelograms, scalene triangles, irregular hexagons, etc. The grid pattern may be a grid pattern in which a plurality of types of polygons are regularly repeated, or a grid pattern in which a plurality of types of polygons irregularly adjoin each other. Various grid patterns are thus possible. The multiplicity of protrusions may be randomly arranged.

For example, the engagement protrusion inserted through the insertion hole is prevented from coming off from the insertion hole by retaining the engagement protrusion by the other member as in the second to sixth aspects of the invention. The second aspect of the invention is the case where the engagement protrusion and the insertion hole have different sectional shapes. In this case, for example, the engagement protrusion having the shape of a flat plate is pressed into the insertion hole having a bent portion, so that the engagement protrusion is elastically deformed so as to conform to the bent portion, or the insertion hole having the bent portion is elastically deformed into a linear shape so as to conform to the flat plate shape of the engagement protrusion. The engagement protrusion and the insertion hole are thus retained by each other. Alternatively, the engagement protrusion having the bent portion may be inserted into the insertion hole having a rectangular shape so that at least one of the engagement protrusion and the insertion hole is elastically deformed. Both the engagement protrusion and the insertion hole may be elastically deformed.

The third aspect of the invention is the case where the engagement protrusion is moved into the retaining hole continuous with the insertion hole, so that at least one of the engagement protrusion and the retaining hole is elastically deformed, and thus the engagement protrusion and the retaining hole are retained by each other. One of the engagement protrusion and the retaining hole may be elastically deformed, or both of the engagement protrusion and the retaining hole may be elastically deformed. For example, a plurality of retaining claws may be provided in the retaining hole so that the retaining claws elastically deform and dig into the engagement protrusion.

In the fourth aspect of the invention, the tip end of the engagement protrusion which protrudes from the insertion hole is bent and deformed, so that the engagement protrusion is retained by the retaining portion. For example, the engagement protrusion can be retained by the retaining portion by bending and deforming the engagement protrusion and then turning the engagement protrusion along the back surface of the other member. However, the engagement protrusion can be retained by the retaining portion in various manners. For example, the engagement protrusion may be retained by merely pressing the engagement protrusion into the retaining portion from an insertion opening having a size smaller than the radial dimension of the engagement protrusion when bending and deforming the engagement protrusion.

In the fifth aspect of the invention, the non-circular head portion is provided at the tip end of the engagement protrusion. For example, a T-shaped engagement protrusion is appropriate for this head portion. However, an inverted L-shaped engagement protrusion may be used. Head portions having various shapes may be used as long as the head portion has a non-circular shape as viewed in the insertion direction, namely as long as the shape of the head portion as viewed in the insertion direction is a non-circular shape.

EMBODIMENTS

Embodiments of the present invention will be described in detail below with reference to the accompanying drawings.

Figure 2:
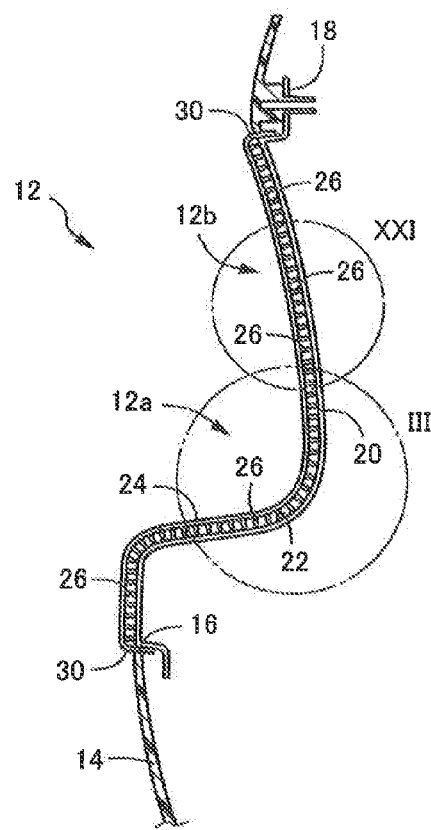
FIG. 2 is an enlarged sectional view taken along line II-II and viewed in the direction of arrows in FIG. 1.
Figure 3:
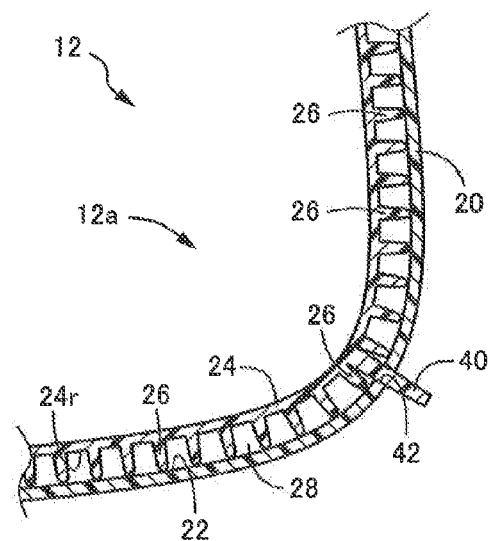
FIG. 3 is an enlarged sectional view of a portion III of an armrest part in FIG. 2.

FIG. 1 is a schematic front view of a vehicle door trim 10 to which the present invention is applied as viewed from a design surface side, namely from an interior of a vehicle. FIG. 2 is an enlarged sectional view of the vehicle door trim 10 taken along line II-II and viewed in the direction of arrows in FIG. 1. That is, FIG. 2 is a vertical section of an armrest part 12 provided in the vehicle door trim 10. FIG. 3 is an enlarged sectional view of a portion III in FIG. 2. The armrest part 12 corresponds to a laminated composite part. The armrest part 12 is fitted in an opening 16 in a door trim body 14 from a back side (the right side in FIG. 2) of the door trim body 14, and is fixedly attached to the door trim body 14 via a plurality of attachment portions 18 provided at a peripheral edge of the armrest part 12.

The armrest part 12 is formed by a three-dimensionally curved plate-like base material 20, and a plate-like surface material 24 set on a surface 22 of the base material 20 so as to be substantially parallel to the surface 22. The surface material 24 is a second member, and is molded as a single-piece member with a relatively soft, elastically deformable synthetic resin material such as soft polyvinyl chloride. A multiplicity of fine protrusions 26 that protrude toward the surface 22 of the base material 20 are formed integrally with the surface material 24 on a back surface 24r of the surface material 24, namely on a surface facing the base material 20, so as to spread all over the back surface 24r. These fine protrusions 26 create space 28 between the surface material 24 and the surface 22. An outer peripheral terminal portion 30 of the surface material 24 wraps around and is fixed to an outer peripheral edge of the base material 20 with tip ends of the fine protrusions 26 being in close contact with the surface 22. As the armrest part 12 is fitted in the opening 16 of the door trim body 14, the outer peripheral terminal portion 30 is pressed by the outer peripheral edge of the base material 20 in the opening 16, and is thus kept in close contact with the outer peripheral edge. However, as necessary, the outer peripheral terminal portion 30 may be fixed to the outer peripheral edge of the base material 20 by fixing means such as an adhesive. The base material 20 corresponds to a first member, and is molded as a single-piece member with a synthetic resin material harder than the surface material 24, such as polypropylene. The attachment portions 18 are provided integrally with the base material 20. The fine protrusions 26 correspond to protrusions, and the surface 22 of the base material 20 corresponds to a mating surface. Woven fabric, nonwoven fabric, etc. may be placed on a front surface of the surface material 24, namely the design surface on the opposite side from the fine protrusions 26.

Figure 4:
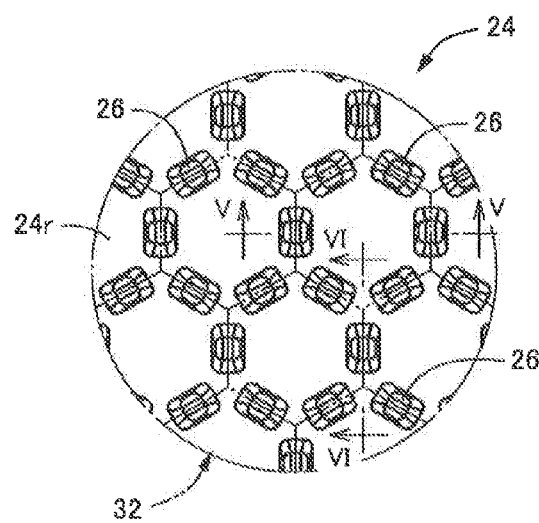
FIG. 4 is an enlarged plan view of the multiplicity of fine protrusions formed on the back surface of the surface material of FIG. 3 as viewed in the perpendicular direction.
Figure 5:
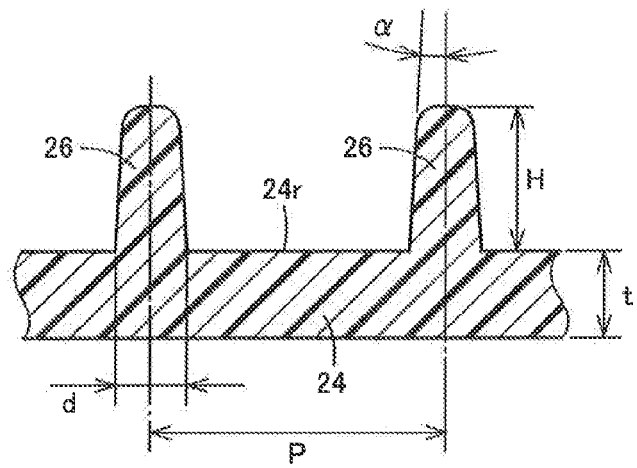
FIG. 5 is an enlarged elevational section taken along line V-V and viewed in the direction of arrows in FIG. 4.
Figure 6:
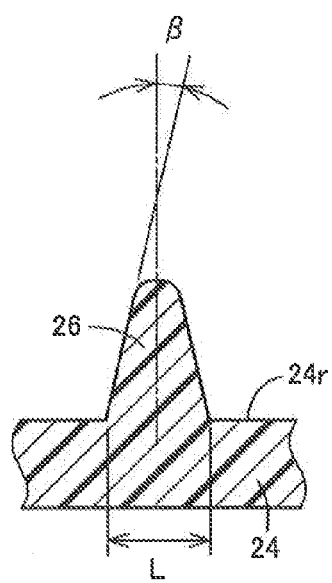
FIG. 6 is an enlarged elevational section taken along line VI-VI and viewed in the direction of arrows in FIG. 4.

FIG. 4 is a diagram illustrating the multiplicity of fine protrusions 26 formed on the back surface 24r of the surface material 24, which is an enlarged plan view as viewed in the direction perpendicular to the back surface 24r. FIG. 5 is an enlarged elevational section taken along line V-V and viewed in the direction of arrows in FIG. 4. FIG. 6 is an enlarged elevational section taken along line VI-VI and viewed in the direction of arrows in FIG. 4. As can be seen from these figures, the multiplicity of fine protrusions 26 have the same shape, and have an oblong shape (in the present embodiment, a rectangular shape) as viewed in plan (in the state of FIG. 4). The fine protrusions 26 are positioned so as to form each side of a multiplicity of polygons having the same shape so that the fine protrusions 26 form a grid pattern 32 in which adjoining ones of the polygons have a common side. In the present embodiment, each of the fine protrusions 26 has a rectangular shape with four round corners, and is disposed in such a position that the longitudinal direction thereof coincides with a direction in which a corresponding one of the sides of the polygon extends, as viewed in plan. As shown by two-dot chain lines in FIG. 4, the grid pattern 32 is a honeycomb pattern formed by continuous repetition of regular hexagons having a fixed size as the polygons, and the fine protrusions 26 are provided one by one in a central portion of each side of the regular hexagons.

As can be seen from FIGS. 5 and 6, each of the fine protrusions 26 has a gently tapered shape so that its sectional area decreases toward its tip end. Both the elevational section in FIG. 5 taken along the lateral direction perpendicular to the longitudinal direction and the elevational section in FIG. 6 taken along the longitudinal direction have a symmetrical shape with respect to a neutral plane perpendicular to the back surface 24r, and have a round peripheral edge (both ends of the sectional shape) at the tip end. The fine protrusions 26 will be further described below. A pitch P as an interval between two parallel sides of each regular hexagon of the grid pattern 32, namely the distance between the centers of the fine protrusions 26 provided on the two sides, is 4 mm≤P≤7 mm, and in the present embodiment, about 5 mm. A height dimension H of the fine protrusions 26 is 2 mm≤H≤3.5 mm, and in the present embodiment, about 2.5 mm. A lateral dimension d of the fine protrusions 26 is 1 mm≤d≤2 mm, and in the present embodiment, about 1.2 mm. A longitudinal dimension L of the fine protrusions 26 is 1.5 mm≤L≤2.5 mm, and is larger than the lateral dimension d. In the present embodiment, the longitudinal dimension L is about 1.8 mm. A tilt angle α of both sidewalls in the lateral direction of the fine protrusions 26 is 2°≤α≤5°, and in the present embodiment, about 3°. A tilt angle β of both edges in the longitudinal direction of the fine protrusions 26 is in the range of 10° to 15°, and in the present embodiment, about 13°. A thickness t of the surface material 24 having the fine protrusions 26 is in the range of 1 mm≤t≤2 mm, and in the present embodiment, about 1.5 mm. These dimensions and angles are determined as appropriate in view of a material of the surface material 24 etc. so that the surface material 24 has a predetermined feel (soft feel etc.).

When the surface material 24 is pressed with a finger or hand, the tip ends of the fine protrusions 26 are pressed against the surface 22 of the base material 20 and elastically deformed. Such an armrest part 12 thus has cushioning properties and has a predetermined feel. In the present embodiment, the multiplicity of fine protrusions 26 have a symmetrical shape. Accordingly, when a pressing load is applied to the back surface 24r in the direction perpendicular thereto, the fine protrusions 26 are basically compressively deformed in the vertical direction in FIGS. 5 and 6, whereby the armrest part 12 has cushioning properties. When a pressing load is applied to the back surface 24r in an oblique direction, the fine protrusions 26 are flexurally deformed in a direction (lateral direction in FIG. 5) perpendicular to the longitudinal direction as well as compressively deformed in the vertical direction, whereby the armrest part 12 has cushioning properties.

The fine protrusions 26 are merely in contact with the surface 22 of the base material 20. Accordingly, there conventionally is a risk that a gap may appear between the surface 22 of the base material 20 and the fine protrusions 26 in a curved portion curved two-dimensionally or three-dimensionally so as to provide a recessed design surface, such as a sharply curved portion 12a in FIG. 2. The surface material 24 may therefore get loose or wrinkled or be lifted, and abnormal noise may be generated due to a position shift associated with such a loose or lifted surface material 24, which may adversely affect product quality. The portion III in FIG. 2, namely the portion shown in FIG. 3, corresponds to the sharply curved portion 12a.

Figure 7A:
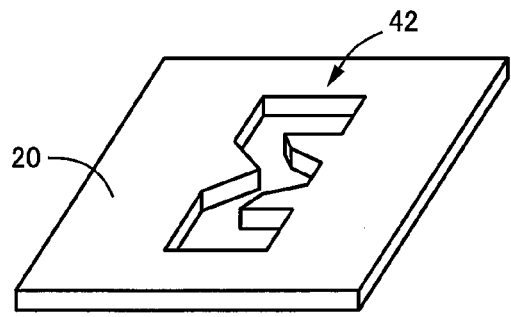
FIGS. 7A and 7B are perspective views depicting a state before the engagement protrusion in FIG. 3 is inserted into the insertion hole.
Figure 7B:
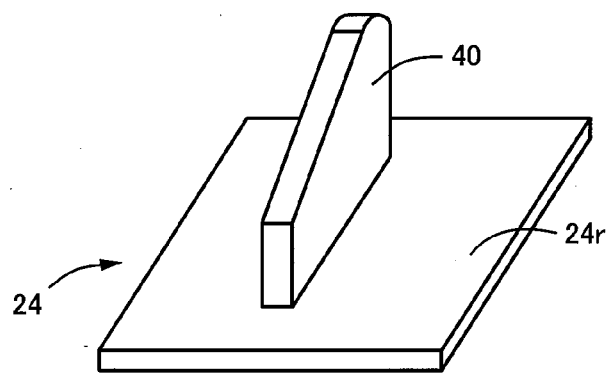
Figures 8A, 8B, 8C:
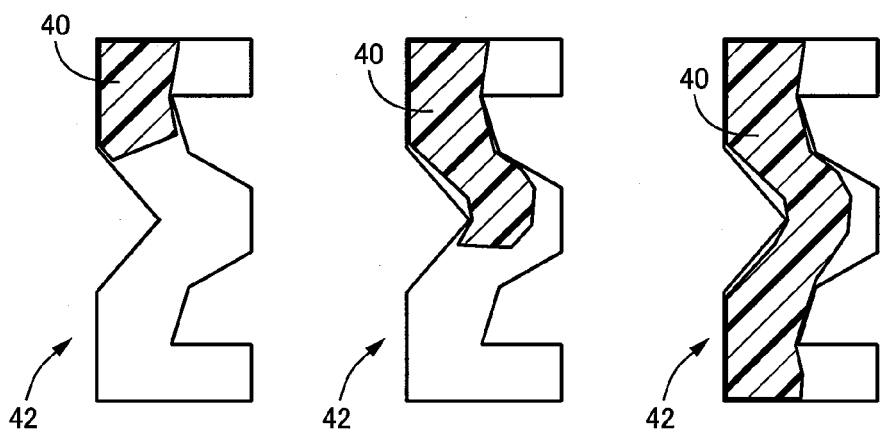
FIGS. 8A to 8C are diagrams for explaining deformed states of the engagement protrusions when the engagement protrusion in FIG. 7B is inserted into the insertion
Figure 9A:
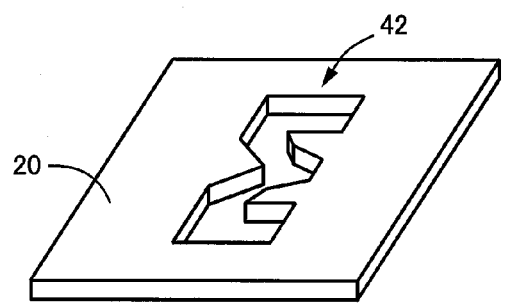
FIGS. 9A and 9B are diagrams depicting another example of the engagement protrusion and the insertion hole in FIG. 3, and perspective views corresponding to FIGS. 7A and 7B.
Figure 9B:
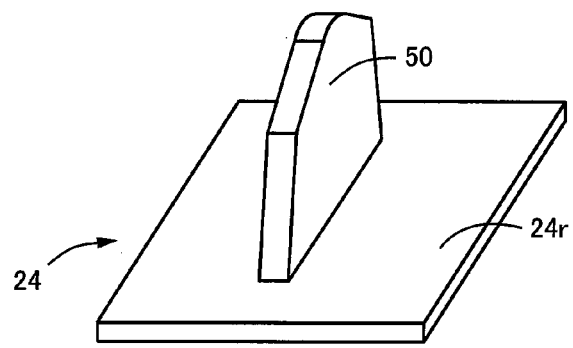

As a solution to this problem, in the armrest part 12 of the present embodiment, the surface material 24 and the base material 20 are provided with an engagement protrusion 40 and an insertion hole 42, respectively, in the sharply curved portion 12a as shown in FIG. 3. The engagement protrusion 40 is engaged with the insertion hole 42 to prevent the surface material 24 from getting loose, being lifted, etc. FIGS. 7A and 7B show an example of the engagement protrusion 40 and the insertion hole 42. The engagement protrusion 40 and the insertion hole 42 have different sectional shapes taken along a direction perpendicular to an insertion direction. When the surface material 24 is relatively moved toward the base material 20 and the engagement protrusion 40 is inserted into the insertion hole 42, at least one of the engagement protrusion 40 and the insertion hole 42 is elastically deformed, and the engagement protrusion 40 is retained in the insertion hole 42 based on this elastic deformation. Specifically, the engagement protrusion 40 provided so as to stand substantially perpendicularly to the back surface 24r of the surface material 24 has the shape of a flat plate, and has a linear section taken along the direction perpendicular to the insertion direction. A tip end portion of the engagement protrusion 40 has a triangular shape protruding at its one end. The insertion hole 42 in the base material 20 includes a plurality of bent portions so as to form a generally M-shape. When the engagement protrusion 40 is inserted into the insertion hole 42, the engagement protrusion 40 is gradually elastically deformed from its one end so as to conform to the bent shape of the insertion hole 42 as the insertion of the engagement protrusion 40 proceeds, as shown in FIGS. 8A to 8C. The engagement protrusion 40 is retained in the insertion hole 42 due to a restoring force associated with the elastic deformation, whereby predetermined retaining strength is obtained. FIGS. 8A to 8C show sectional shapes (deformed states) of a part of the engagement protrusion 40 which has been inserted in the insertion hole 42. FIG. 8A shows an initial stage of the insertion, FIG. 8B shows an intermediate stage of the insertion, and FIG. 8C shows a state where insertion has been completed, namely a state where the base material 20 is combined with the surface material 24 with the fine protrusions 26 being in contact with the surface 22 of the base material 20 as shown in FIG. 3. The surface material 24 provided with the engagement protrusion 40 corresponds to one member, and the base material 20 provided with the insertion hole 42 corresponds to the other member. The multiplicity of fine protrusions 26 provided on the back surface 24r of the surface material 24 are not shown in FIG. 7B. The fine protrusions 26 are also not shown in FIGS. 9B, 11B, 12A, 12B, 13B, 14A, 14B, 16B, 17A, 17B, 18B, 19A and 19B.

As described above, in the armrest part 12 of the present embodiment, the engagement protrusion 40 is provided on the surface material 24 located on the design surface side of the sharply curved portion 12a curved so as to provide a recessed design surface, and the engagement protrusion 40 is inserted into the insertion hole 42 in the base material 20, and is retained by the base material 20 so as not to come off from the insertion hole 42. This prevents the surface material 24 from getting loose or wrinkled, being lifted, etc. regardless of the shape of the curve, which improves product quality.

In the present embodiment, the engagement protrusion 40 and the insertion hole 42 have different sectional shapes from each other, and the engagement protrusion 40 is elastically deformed when it is inserted into the insertion hole 42. The engagement protrusion 40 is thus retained in the insertion hole 42 based on the elastic deformation. Since the engagement protrusion 40 can be retained in the insertion hole 42 by merely pressing the engagement protrusion 40 into the insertion hole 42, an operation of combining the surface material 24 and the base material 20 can be easily and quickly performed.

A deformation load, namely the retaining strength, of the engagement protrusion 40 can be appropriately adjusted (tuned) by changing the shape or the number of bent portions of the insertion hole 42. An appropriate engagement state can therefore be easily obtained.

Since the surface material 24 having the multiplicity of fine protrusions 26 is provided with the engagement protrusion 40, and the hard base material 20 is provided with the insertion hole 42, the engagement protrusion 40 provided on the elastically deformable surface material 24 can be appropriately retained in the base material 20. Moreover, predetermined rigidity is ensured by the hard base material 20, and the surface material 24 has an excellent feel when pressed by a finger or hand due to elastic deformation of the fine protrusions 26 provided on the surface material 24.

Another embodiment of the present invention will be described below. In this embodiment, those portions that are substantially the same as the above embodiment are denoted with the same reference characters, and detailed description thereof will be omitted.

Figures 10A, 10B, 10C:
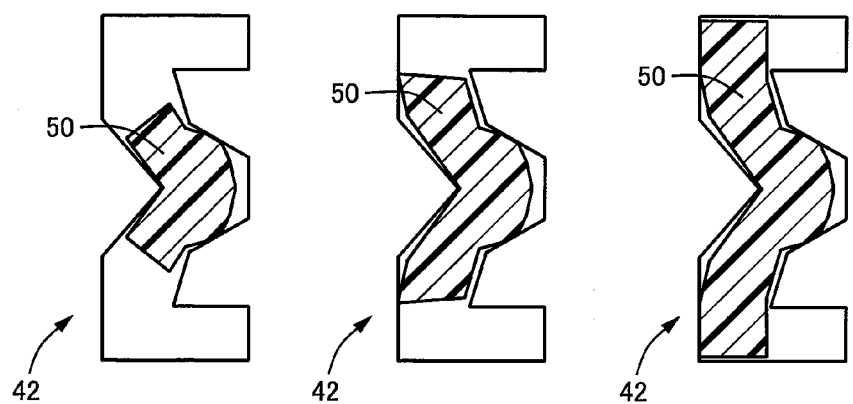
FIGS. 10A to 10C are diagrams for explaining deformed states of the engagement protrusions when the engagement protrusion in FIG. 9B is inserted into the insertion hole.

FIGS. 9A, 9B and 10A to 10C are diagrams corresponding to FIGS. 7A, 7B and 8A to 8C, illustrating another example of the engagement protrusion. That is, an engagement protrusion 50 is the same as the engagement protrusion 40 in that the engagement protrusion 50 has the shape of a flat plate, and has a linear section taken along the direction perpendicular to the insertion direction. However, the engagement protrusion 50 is different from the engagement protrusion 40 in that a tip end portion of the engagement protrusion 50 has the shape of an isosceles triangle protruding in the middle. In this case, as insertion of the engagement protrusion 50 proceeds, the engagement protrusion 50 is gradually elastically deformed from a central portion of its tip end so as to conform to the bent shape of the insertion hole 42, as shown in FIGS. 10A to 10C. The engagement protrusion 50 is retained in the insertion hole 42 due to a restoring force associated with the elastic deformation, whereby predetermined retaining strength is obtained. The present embodiment has functions and effects similar to those of the above embodiment.

Figure 11A:
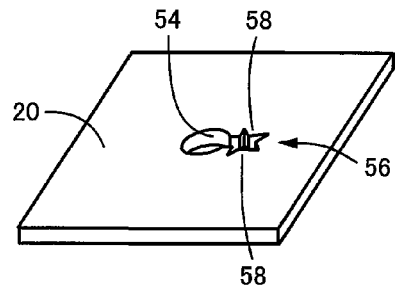
FIGS. 11A and 11B are diagrams depicting yet another example of the engagement protrusion and the insertion hole in FIG. 3, and perspective views corresponding to FIGS. 7A and 7B.
Figure 11B:
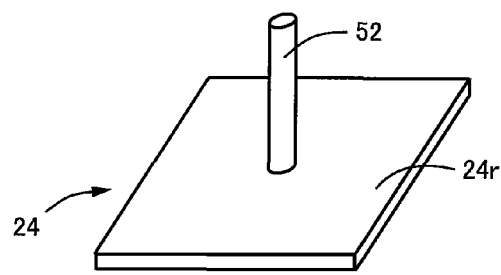
Figure 12A:
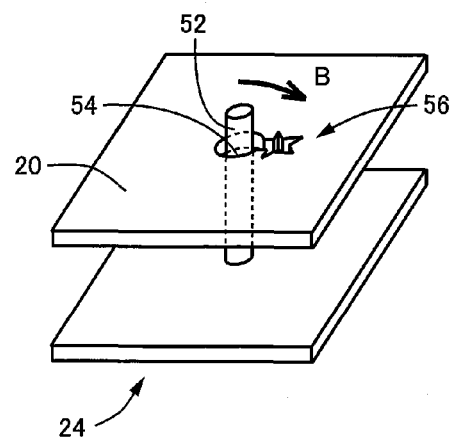
FIGS. 12A and 12B show diagrams illustrating a manner in which the engagement protrusion of FIG. 11B is deformed when inserted through the insertion hole and retained in a retaining hole that is continuous with the insertion hole.
Figure 12B:
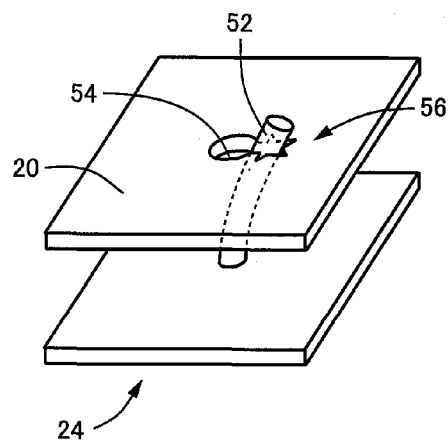
Figure 13A:
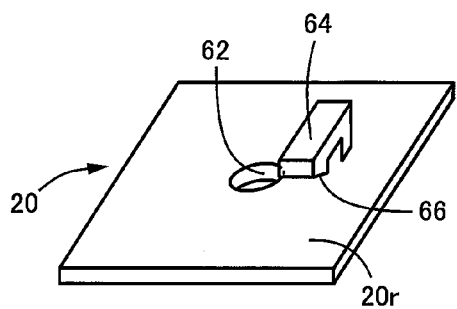
FIGS. 13A and 13B are diagrams depicting yet another example of the engagement protrusion and the insertion hole in FIG. 3, and perspective views corresponding to FIGS. 7A and 7B.
Figure 13B:
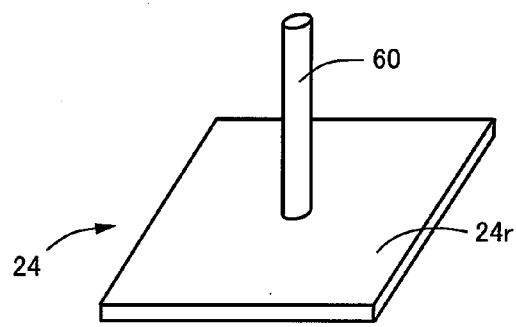

FIGS. 11A and 11B show perspective views corresponding to FIGS. 7A and 7B, illustrating still another example of the engagement protrusion and the insertion hole. An engagement protrusion 52 has a columnar shape, and is provided so as to stand substantially perpendicularly to the back surface 24r of the surface material 24. An insertion hole 54 having a larger diameter than that of the engagement protrusion 52 is formed in the base material 20, and a retaining hole 56 continuous with the insertion hole 54 is also formed in the base material 20. The retaining hole 56 has the shape of a star having a plurality of retaining claws 58 extending inward. The radial dimension of a circle connecting tip ends of the retaining claws 58 is smaller than that of the engagement protrusion 52, and the engagement protrusion 52 is elastically deformed and retained with the retaining claws 58 digging into an outer peripheral surface of the engagement protrusion 52. Accordingly, after the surface material 24 is relatively moved toward the base material 20 and the engagement protrusion 52 is inserted through the insertion hole 54 as shown in FIG. 12A, the engagement protrusion 52 is moved as shown by an arrow B so as to be flexurally deformed and pressed into the retaining hole 56. The retaining claws 58 thus dig into and retain the engagement protrusion 52 as shown in FIG. 12B, whereby the engagement protrusion 52 is prevented from coming off with predetermined retaining strength.

Also in the present embodiment, the engagement protrusion 52 is provided on the surface material 24 located on the design surface side of the sharply curved portion 12a curved so as to provide a recessed design surface, and the engagement protrusion 52 is inserted into the insertion hole 54 in the base material 20, and is retained by the base material 20 so as not to come off from the insertion hole 54. This prevents the surface material 24 from getting loose or wrinkled, being lifted, etc. regardless of the shape of the curve, which improves product quality.

The retaining hole 56 is continuous with the insertion hole 54, and the engagement protrusion 52 is moved into the retaining hole 56 after being inserted through the insertion hole 54. The retaining claws 58 thus dig into and retain the engagement protrusion 52, so that the engagement protrusion 52 is prevented from coming off. Since the engagement protrusion 52 can be retained by merely moving the engagement protrusion 52 inserted through the insertion hole 54 into the retaining hole 56. The operation of combining the surface material 24 and the base material 20 can therefore be easily and quickly performed.

The retaining strength for the engagement protrusion 52 can be appropriately adjusted (tuned) by changing the dimensions or shape of the retaining claws 58 of the retaining hole 56. An appropriate engagement state can therefore be easily obtained.

Figure 14A:
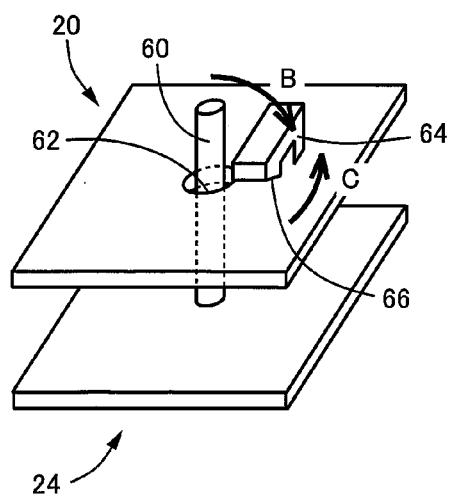
FIGS. 14A and 14B show diagrams illustrating a manner in which the engagement protrusion of FIG. 13B is deformed when inserted through the insertion hole and retained in a retaining portion that is provided near the insertion hole.
Figure 14B:
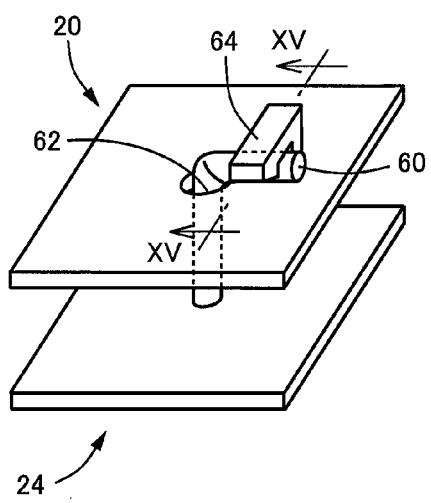
Figure 15:
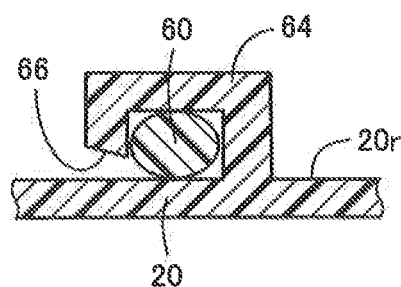
FIG. 15 is a sectional view taken along line XV-XV and viewed in the direction of arrows in FIG. 14B.
Figure 16A:
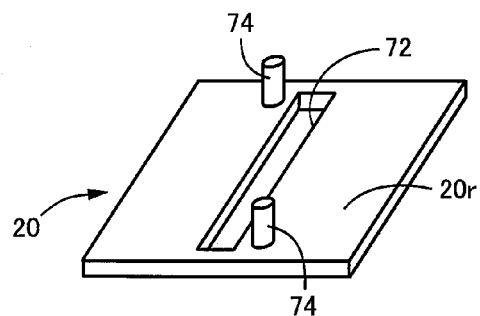
FIGS. 16A and 16B are diagrams depicting yet another example of the engagement protrusion and the insertion hole in FIG. 3, and perspective views corresponding to FIGS. 7A and 7B.
Figure 16B:
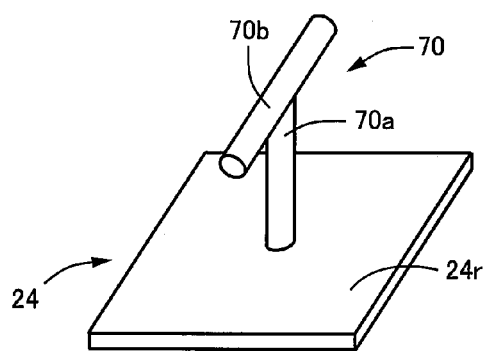

FIGS. 13A, 13B, 14A and 14B are diagrams corresponding to FIGS. 11A, 11B, 12A and 12B, and FIG. 15 is a sectional view taken along line XV-XV and viewed in the direction of arrows in FIG. 14B, illustrating yet another example of the engagement protrusion and the insertion hole. An engagement protrusion 60 has a columnar shape, and is provided so as to stand substantially perpendicularly to the back surface 24r of the surface material 24. An insertion hole 62 having a larger diameter than that of the engagement protrusion 60 is formed in the base material 20, and a retaining portion 64 formed integrally with the base material 20 is provided near the insertion hole 62 on a back surface 20r of the base material 20 which is located on the opposite side from the surface material 24. As can be seen from FIG. 15, the retaining portion 64 is provided in the form of a cantilever on the back surface 20r of the base material 20, and retains the engagement protrusion 60 by holding the engagement protrusion 60 between the back surface 20r and the retaining portion 64 itself. The retaining portion 64 has an insertion opening 66 tilted so as to be separated further away from the back surface 20r as it gets closer to its tip end. The engagement protrusion 60 can thus be laterally inserted into the retaining portion 64 from the insertion opening 66 while being elastically deformed so as to be compressed in the radial direction. Accordingly, after the surface material 24 is relatively moved toward the base material 20 and the engagement protrusion 60 is inserted through the insertion hole 62 as shown in FIG. 14A, the tip end protruding toward the back side (upward in the figure) from the insertion hole 62 is bent and deformed by approximately 90° as shown by an arrow B, and is turned along the back surface 20r as shown by an arrow C. The engagement protrusion 60 is thus pressed into the retaining portion 64 from the insertion opening 66 and retained therein as shown in FIG. 14B. The engagement protrusion 60 is thus bent and retained by the retaining portion 64, whereby the engagement protrusion 60 is prevented from coming off with predetermined retaining strength.

Also in the present embodiment, the engagement protrusion 60 is provided on the surface material 24 located on the design surface side of the sharply curved portion 12a curved so as to provide a recessed design surface, and the engagement protrusion 60 is inserted into the insertion hole 62 in the base material 20, and is retained by the base material 20 so as not to come off from the insertion hole 62. This prevents the surface material 24 from getting loose or wrinkled, being lifted, etc. regardless of the shape of the curve, which improves product quality.

The retaining portion 64 is provided near the insertion hole 62, and the engagement protrusion 60 is retained by the retaining portion 64 by inserting the engagement protrusion 60 through the insertion hole 62 and then bending and deforming the tip end of the engagement protrusion 60. Since the engagement protrusion 60 can be retained by the retaining portion 64 by merely bending and deforming the tip end of the engagement protrusion 60 inserted through the insertion hole 62, the operation of combining the surface material 24 with the base material 20 can be easily and quickly performed.

Figure 17A:
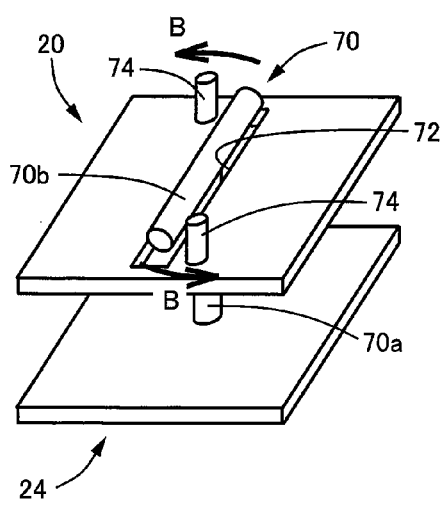
FIGS. 17A and 17B show diagrams illustrating a manner in which the engagement protrusion of FIG. 16B is deformed when inserted through the insertion hole and retained in a retaining protrusion that is provided near the insertion hole.
Figure 17B:
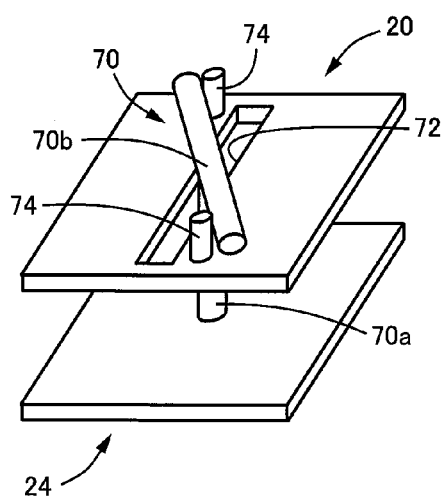
Figure 18A:
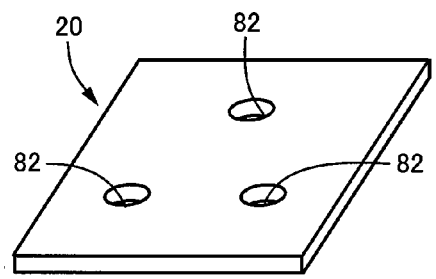
FIGS. 18A and 18B are diagrams depicting yet another example of the engagement protrusion and the insertion hole in FIG. 3, and perspective views corresponding to FIGS. 7A and 7B.
Figure 18B:
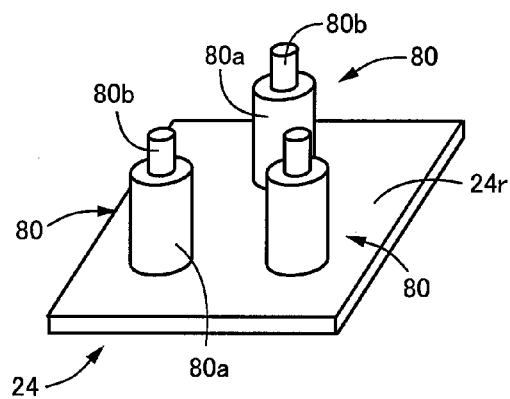

FIGS. 16A, 16B, 17A and 17B are diagrams corresponding to FIGS. 11A, 11B, 12A and 12B, illustrating a further example of the engagement protrusion and the insertion hole. An engagement protrusion 70 has a T-shape, and includes a shaft portion 70a having a columnar shape and provided so as to stand substantially perpendicularly to the back surface 24r of the surface material 24, and a head portion 70b having a columnar shape and formed on a tip end of the shaft portion 70a integrally with the shaft portion 70a so as to extend substantially perpendicularly to the shaft portion 70a. A rectangular insertion hole 72 having a larger lateral dimension than the radial dimension of the columnar shape of the head portion 70b is formed in the base material 20, and a pair of retaining protrusions 74 are formed, integrally with the base material 20, on the back surface 20r located on the opposite side of the base material 20 from the surface material 24 so as to stand near both ends of the insertion hole 72. The insertion hole 72 is provided so as to correspond to the head portion 70b in a natural state of the engagement protrusion 70 so that the head portion 70b is inserted into the insertion hole 72 when the surface material 24 is relatively moved toward the base material 20. Accordingly, after the surface material 24 is relatively moved toward the base material 20 and the engagement protrusion 70 is inserted through the insertion hole 72 as shown in FIG. 17A, the head portion 70b protruding toward the back side (upward in the figure) from the insertion hole 72 is twisted and deformed about an axis of the shaft portion 70a as shown by an arrow B so as to cross over the retaining protrusions 74. Both ends of the head portion 70b are thus retained by the retaining protrusions 74 as shown in FIG. 17B, and the head portion 70b is prevented from deforming back to its original shape. The head portion 70b is thus prevented from coming off from the insertion hole 72, and the engagement protrusion 70 is prevented from coming off with predetermined retaining strength.

Also in the present embodiment, the engagement protrusion 70 is provided on the surface material 24 located on the design surface side of the sharply curved portion 12a curved so as to provide a recessed design surface, and the engagement protrusion 70 is inserted into the insertion hole 72 in the base material 20, and is retained by the base material 20 so as not to come off from the insertion hole 72. This prevents the surface material 24 from getting loose or wrinkled, being lifted, etc. regardless of the shape of the curve, which improves product quality.

The head portion 70b having a non-circular shape as viewed in the insertion direction is provided at a tip end of the engagement protrusion 70, and the head portion 70b is twisted and deformed after being inserted through the insertion hole 72, whereby the engagement protrusion 70 is retained by the retaining protrusions 74 provided near the insertion hole 72. The engagement protrusion 70 inserted through the insertion hole 72 need only be twisted and deformed about the axis of the shaft portion 70a so that both ends of the head portion 70b are retained by the retaining protrusions 74. The operation of combining the surface material 24 with the base material 20 can therefore be easily and rapidly performed.

Figure 19A:
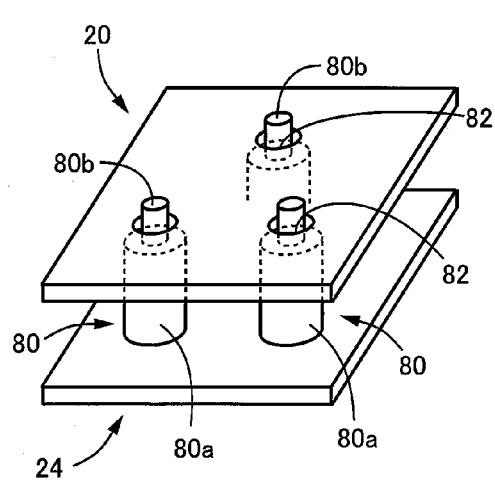
FIGS. 19A and 19B are diagrams for explaining a step at which the engagement protrusion in FIG. 18B is inserted into the insertion hole, and protruding tip ends are thus fixedly attached to the base material by insert molding.
Figure 19B:
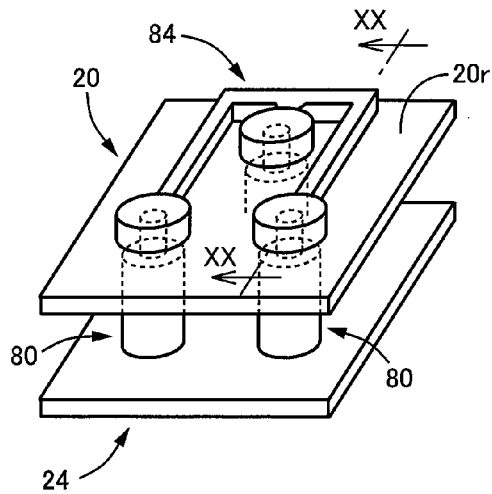
Figure 20:
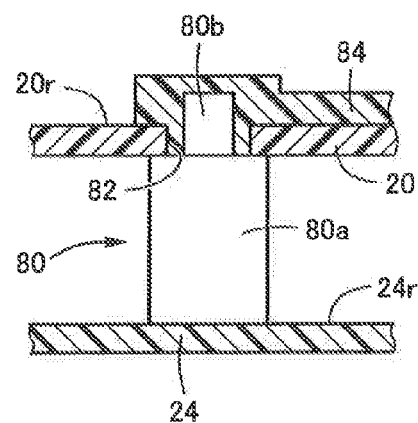
FIG. 20 is a sectional view taken along line XX-XX and viewed in the direction of arrows in FIG. 19B.

FIGS. 18A, 18B, 19A and 19B are diagrams corresponding to FIGS. 11A, 11B, 12A and 12B, illustrating a still further example of the engagement protrusion and the insertion hole. FIG. 20 is a sectional view taken along line XX-XX and viewed in the direction of arrows in FIG. 19B. Engagement protrusions 80 have a stepped columnar shape and are provided so as to stand substantially perpendicularly to the back surface 24r of the surface material 24. Each of the engagement protrusions 80 includes a base portion 80a having a large diameter, and a protruding tip end 80b formed integrally and concentrically with the base portion 80a and protruding in the axial direction from the base portion 80a. Insertion holes 82 having a diameter smaller than that of the base portion 80a and larger than that of the protruding tip end 80b are formed in the base material 20. With the protruding tip ends 80b being inserted through the insertion holes 82 and protruding toward the back side (upward in the figure) and the base portions 80a being in contact with the base material 20 as shown in FIG. 19A, a seal member 84 is integrally formed on the back surface 20r of the base material 20 including exposed portions of the protruding tip ends 80b by insert molding as shown in FIG. 19B. The protruding tip ends 80b are thus fixedly attached to the base material 20 via the seal member 84, and the engagement protrusions 80 are prevented from coming off from the insertion holes 82. The seal member 84 corresponds to a retaining member. If the seal member 84 is formed by using the same synthetic resin material as that of the surface material 24, the seal member 84 fuses with the engagement protrusions 80, and the engagement protrusions 80 are more firmly fixed to the base material 20.

Also in the present embodiment, the engagement protrusion 80 is provided on the surface material 24 located on the design surface side of the sharply curved portion 12a curved so as to provide a recessed design surface, and the engagement protrusion 80 is inserted into the insertion hole 82 in the base material 20, and is retained by the base material 20 so as not to come off from the insertion hole 82. This prevents the surface material 24 from getting loose or wrinkled, being lifted, etc. regardless of the shape of the curve, which improves product quality.

Each of the engagement protrusions 80 includes the base portion 80a and the protruding tip end 80b. With the protruding tip ends 80b being inserted through the insertion holes 82 and the base portions 80a being in contact with the base material 20, the seal member 84 is integrally formed on the back surface 20r of the base material 20 by insert molding. The protruding tip ends 80b are thus fixedly attached to the base material 20 via the seal member 84. Accordingly, the operation of combining the surface material 24 with the base material 20 can be easily automated, and production efficiency can be improved.

Figure 21:
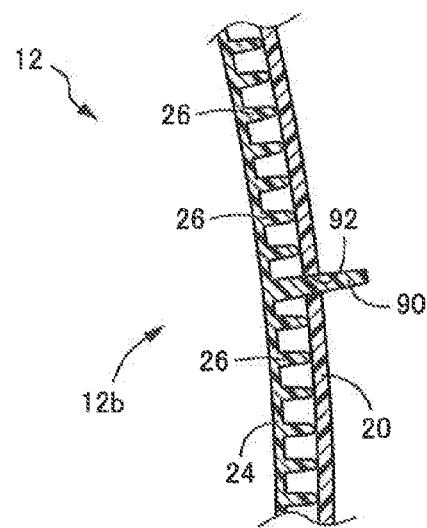
FIG. 21 is a diagram for explaining a case that the present invention is applied to a portion XXI of an armrest part in FIG. 2, and a sectional view corresponding to FIG. 3.

Each of the above embodiments is described with respect to the case where the present invention is applied to the sharply curved portion 12a of the armrest part 12. However, the present invention is also applicable to a gently curved portion 12b (see FIG. 2) having relatively small curvature. That is, since the surface material 24 may undesirably get loose or be lifted in the gently curved portion 12b as well due to gravity etc., an engagement protrusion 90 may be provided on the surface material 24 so as to stand thereon, and an insertion hole 92 may be formed in the base material 20 as shown in FIG. 21, so that the engagement protrusion 90 is retained by the base material 20. The surface material 24 can thus be prevented from getting loose or wrinkled, being lifted, etc. FIG. 21 is an enlarged sectional view of a portion XXI in FIG. 2 where the gently curved portion 12b is provided.

Figure 22:
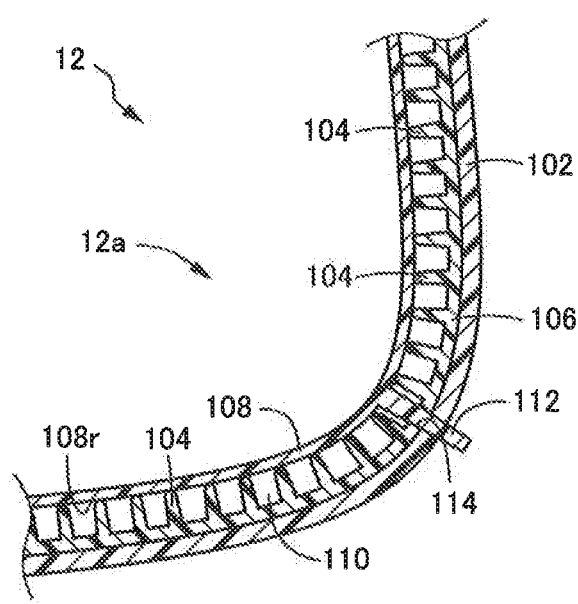
FIG. 22 is a sectional view corresponding to FIG. 3, illustrating another embodiment in which a first member is a surface material and a second member is fixed to a base material.

In the armrest part 12 of FIG. 22, a cushion member 106 having a multiplicity of fine protrusions 104 is provided on a surface of a three-dimensionally curved plate-like base material 102, and a surface material 108 is provided so as to be set on the fine protrusions 104 side of the cushion member 106. Like the base material 20, the base material 102 is made of a relatively hard synthetic resin material. The cushion member 106 corresponds to the second member. The cushion member 106 is made of an elastically deformable synthetic resin material like the surface material 24, and is fixedly attached to the base material 102 by double molding, an adhesive, etc. so as to be in close contact with the surface of the base material 102. The fine protrusions 104 are formed similarly to the fine protrusions 26. The fine protrusions 104 are provided so as to protrude toward the surface material 108, and their tip ends are in contact with a back surface 108r of the surface material 108, so that space 110 is created between the back surface 108r and the cushion member 106. The back surface 108r corresponds to the mating surface. The surface material 108 corresponds to the first member, and in the present embodiment, is made of a relatively soft synthetic resin material like the surface material 24. An engagement protrusion 112 is provided on the back surface 108r of the surface material 108, and an insertion hole 114 is formed in the cushion member 106 and the base material 102. As in the above embodiments, the engagement protrusion 112 is inserted into the insertion hole 114 and is retained by the cushion member 106 or the base material 102 so as to be prevented from coming off. This prevents the surface material 108 from getting loose or wrinkled, being lifted, etc. In this case, in order to prevent the engagement protrusion 112 from coming off by the retaining portion 64, the retaining protrusions 74, or the seal member 84, a relief hole, for example, can be formed in the base material 102 to provide the retaining portion 64 etc. on the cushion member 106. However, the retaining portion 64 etc. may be provided on the base material 102 to retain the engagement protrusion 112 by the base material 102. In short, the engagement protrusion 112 need only be directly retained by the cushion member 106 or retained by the member fixedly attached to the cushion member 106 to obtain predetermined retaining strength.

Although the embodiments of the present invention are described above in detail based on the drawings, the embodiments are shown by way of example only, and the present invention can be embodied in various modified or improved forms based on the knowledge of those skilled in the art.

NOMENCLATURE OF ELEMENTS

12: armrest part (laminated composite part) 12a: sharply curved portion (curved portion) 12b: gently curved portion (curved portion) 20: base material (first member, other member) 22: surface (mating surface) 24: surface material (second member, one member) 26, 104: fine protrusions (protrusions) 28, 110: space 40, 50, 52, 60, 70, 80, 90, 112: engagement protrusion 42, 54, 62, 72, 82, 92, 114: insertion hole 56: retaining hole 64: retaining portion 70b: head portion 74: retaining protrusions 80a: base portion 80b: protruding tip end 84: seal member (retaining member) 106: cushion member (second member, other member) 108: surface material (first member, one member) 108r: back surface (mating surface)

The invention claimed is:

1. A laminated composite part comprising
a first member having a predetermined mating surface, and
a second member that is made of an elastically deformable resin material, that has a plate-like portion substantially parallel to the mating surface and having a multiplicity of protrusions formed integrally with the plate-like portion so as to protrude toward the mating surface so that space is created between the plate-like portion and the mating surface, and that is set on the first member such that the protrusions contact the mating surface,
the laminated composite part having cushioning properties as tip ends of the protrusions are pressed by the mating surface and elastically deformed,
the laminated composite part further comprising a curved portion curved two-dimensionally or three-dimensionally so as to provide a recessed design surface, wherein
an engagement protrusion protruding more than the protrusions is formed integrally with the curved portion of one of the first and second members, which is located on the design surface side, such that the engagement protrusion is disposed in a portion surrounded by the protrusions,
an insertion hole in which the engagement protrusion is relatively inserted is formed in the other member of the first and second members, and
the engagement protrusion is inserted in the insertion hole and is retained so as not to come off from the insertion hole.

2. The laminated composite part according to claim 1, wherein
the engagement protrusion and the insertion hole have different sectional shapes taken along a direction perpendicular to an insertion direction, and at least one of the engagement protrusion and the insertion hole is elastically deformed when the engagement protrusion is inserted into the insertion hole, so that the engagement protrusion and the insertion hole are retained by each other based on the elastic deformation.

3. The laminated composite part according to claim 1, wherein
a retaining hole having a different sectional shape from that of the engagement protrusion is formed so as to be continuous with the insertion hole, and the engagement protrusion is moved into the retaining hole after being inserted through the insertion hole, so that at least one of the engagement protrusion and the retaining hole is elastically deformed, and the engagement protrusion and the retaining hole are retained by each other.

4. The laminated composite part according to claim 1, wherein
a retaining portion is provided near the insertion hole on a back surface of the other member, the back surface is located on an opposite side from the one member, and
after the engagement protrusion is inserted through the insertion hole, a tip end of the engagement protrusion which protrudes from the insertion hole is bent and deformed, so that the engagement protrusion is retained by the retaining portion.

5. The laminated composite part according to claim 1, wherein
a head portion having a non-circular shape as viewed in an insertion direction is provided at a tip end of the engagement protrusion,
the insertion hole has a non-circular shape configured to receive the head portion therein, and a retaining protrusion is provided near the insertion hole on a back surface of the other member, the back surface is located on an opposite side from the one member,
with the head portion of the engagement protrusion being inserted through the insertion hole so as to protrude toward the opposite side, the engagement protrusion is twisted and deformed so that the head portion crosses over the retaining protrusion, so that the head portion is retained by the retaining protrusion.

6. The laminated composite part according to claim 1, wherein the engagement protrusion includes a base portion larger than the insertion hole, and a protruding tip end formed integrally with the base portion and protruding in an axial direction from the base portion, and with the protruding tip end being inserted through the insertion hole and the base portion being in contact with the other member, a retaining member is integrally formed on the other member including an exposed portion of the protruding tip end by insert molding, so that the protruding tip end is fixedly attached to the other member via the retaining member.

7. The laminated composite part according to claim 1, wherein the second member is a plate-like surface material located on the design surface side, and the surface material has the engagement protrusion formed integrally with the surface material, and the first member is a plate-like base material made of a harder resin material than the surface material, and the base material has the insertion hole.

* * * * *